Figure 9:
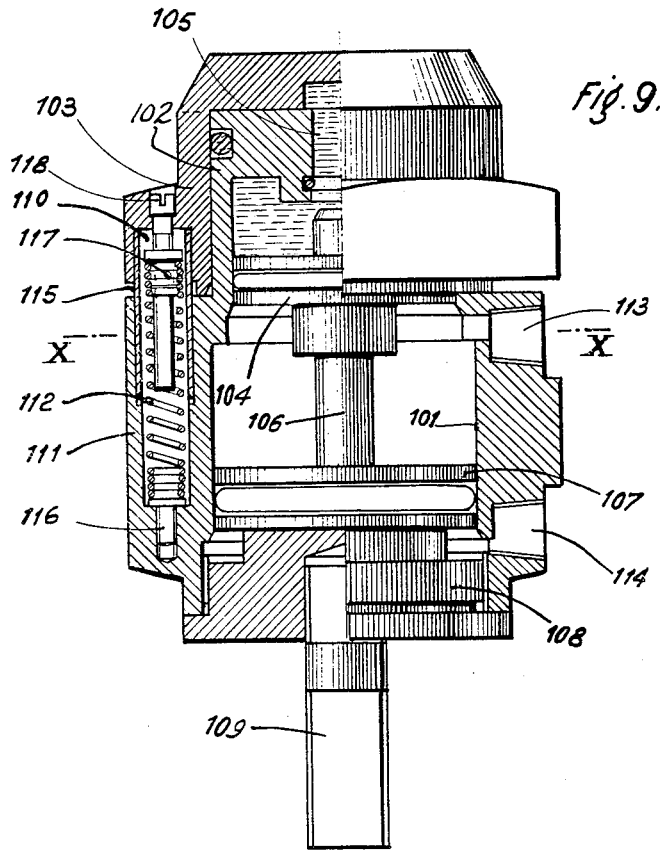

Oct. 26, 1965    E. TOROSSIAN    3,213,623
AEROHYDRAULIC PRESSURE AUTOTRANSFORMER
FOR CHUCKS AND THE LIKE
Filed March 28, 1963    2 Sheets-Sheet 1
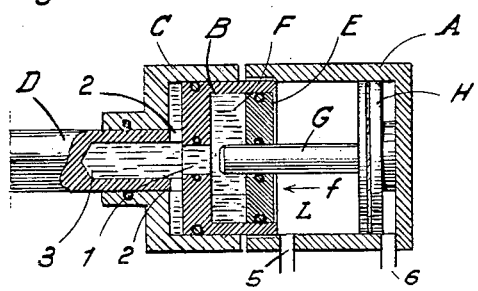
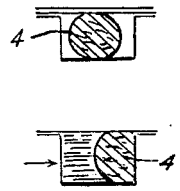
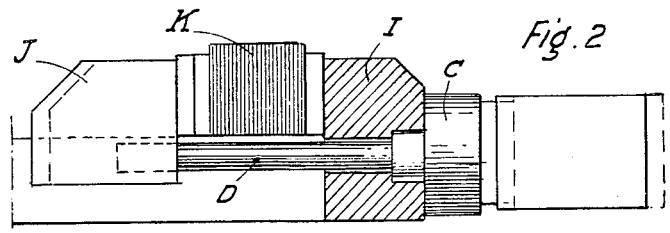
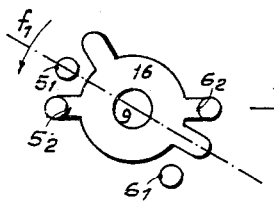
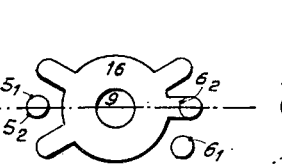
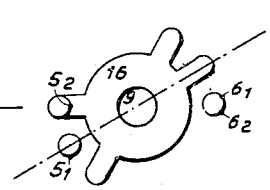

United States Patent Office 3,213,623
Patented Oct. 26, 1965

3,213,623
AEROHYDRAULIC PRESSURE AUTOTRANS-
FORMER FOR CHUCKS AND THE LIKE
Edouard Torossian, Bolleystrasse 50,
Zurich 6, Switzerland
Filed Mar. 28, 1963, Ser. No. 268,817
Claims priority, application Switzerland, Mar. 30, 1962,
4,050/62; Apr. 3, 1962, 4,056/62
11 Claims. (Cl. 60—54.5)

This invention relates to improvements in areohydraulic or hydropneumatic pressure multiplying devices for chucks and the like.

It is known in pressure multiplying devices to use compressed air for obtaining, through a hydraulically operated element in the multiplying device, the two successive distinct operating phases required for any chuck, namely the displacement of the appropriate chuck elements to the point of contact with the object to be clamped, and the application of a clamping force through the action of a piston of relatively small section.

In all of these chucks the action of unclamping and opening the jaws thereof is effected solely by means of restoring springs.

It follows from this that when the jaw closing and clamping operations are instantaneous, owing to the inertia of the elements of the apparatus and in particular owing to the momentary deformation of the sealing rings thereof under pressure, which causes abnormal resistances, the operation of opening the jaws is considerably delayed, due to which not only a loss of time ensues but also it is impossible to include these chucks in automation circuits where all lengths of time must be rigorously controlled.

An object of the present invention is to do away with the foregoing inconveniences and drawbacks of the known devices by pneumatically controlling not only the closing and clamping actions but also the operation of unclamping the tool, with a view of rendering such latter operation as rigorous and instantaneous as the former actions.

The aerohydraulic pressure multiplying device constructed in accordance with my present invention comprises a pneumatic cylinder provided with a cylinder head, a partition movable in said cylinder head forming an extensible fluid reservoir in the cylinder head, a hydraulic cylinder mounted on said head and forming one of the actuating elements of the device, a ram integral with a piston provided in said pneumatic cylinder, extending through an opening in said partition to generate high pressure in the hydraulic cylinder and a rod integral with said pneumatic cylinder head forming the other actuating element of the device.

Other objects and advantages of the invention will appear in the following specification, reference being had to the accompanying drawings in which:

FIG. 1 schematically shows a pressure multiplying device according to the invention in longitudinal section, FIG. 2 serves for explanation and shows the assembly of FIG. 1 applied to a vise, FIGS. 3 and 4 show respectively in section an expanded or distended sealing ring and a sealing ring under compression, FIG. 5 is a partial section of a variant of the device of FIG. 1 coupled to a pivot valve, FIGS. 6 to 8 show diagrammatically successive phase positions of the valve shown in FIG. 5.

Figure 10:
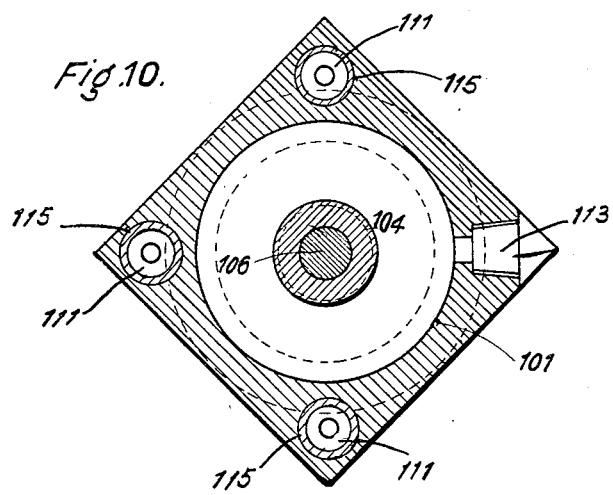

FIG. 9 is a view in elevation, partly in section and partly broken away of another variant, and FIG. 10 is a section on the line X—X of FIG. 9.

As shown in FIG. 1, the pressure multiplying device comprises a pneumatic cylinder A closed by a cup-shaped cylinder head B rigidly secured thereto on which is mounted sealingly and telescopically hydraulic cylinder C.

Cylinder head B is provided with a rod D extending from a face thereof and passing through a hollow hub portion of the hydraulic cylinder C and defines a chamber having a movable partition E which forms an extensible oil reservoir F. The oil reservoir communicates with the hydraulic cylinder C through a central bore 1 in cylinder head B, a hollow portion or pocket 3 formed in rod D and lateral openings 2 in the hollow wall portion of rod D which is an extension of central bore 1.

A ram or plunger G that is integral with a pneumatically operated piston H and passes through a central bore in partition E, is in registry with and is insertable in the bore 1 of the hydraulic cylinder C so as to close bore 1 and to plunge into pocket 3 in order to generate, as is well known in the art, high pressure in hydraulic cylinder C.

It follows from what has been said above, that when pressure is exerted on partition E in the direction of arrow $f$, the fluid contained in the extensible reservoir F flows through bore 1 and the openings 2 into hydraulic cylinder C whereby the latter is also moved in the direction of arrow $f$.

FIG. 2 shows the application of the pressure multiplying device illustrated in FIG. 1 for operating a vise. The end face of the hydraulic cylinder C abuts against the fixed jaw I of the vise, and rod D is connected at its free end to the movable jaw J. When oil enters the hydraulic cylinder C from the reservoir F, the hydraulic cylinder C cannot move toward the left hand side of FIG. 2 because it is stopped by the fixed jaw I of the vise. Consequently the hydraulic pressure in the hydraulic cylinder C causes the cylinder A, cylinder head B and its push rod D to move toward the right in FIG. 2 so that the movable jaw J approaches jaw I and approaches an article K. As shown in FIG. 1, when pneumatic pressure is applied from the right on piston H, ram G plunges into pocket 3 after first having closed bore 1 and isolating the fluid contained in the hydraulic cylinder, thereby causing closure of the chuck jaws.

It is known, however, that when sealing rings 4 are unstressed in the grooves formed in one of the mutually slidable members in the position shown in FIG. 3, they permit a slight relative sliding movement of the members. Under the high pressure, however, the sealing rings 4 undergo a temporary deformation (FIG. 4) which tends to block the relatively slidable members, and this effect maintains the braking action for a specific time, even after decompression, and delays opening of the jaws of the vise, for example, of FIG. 2 so as to require the use of very strong restoring springs for the known devices which increase the dimensions of the apparatus and constitute a useless resorption of motive power.

For the elimination of such drawback and inconvenience, my invention further provides means for effecting a forced and instantaneous expansion or distention of the sealing rings.

To this end, pneumatic cylinder A is provided with two lateral ports 5 and 6. Port 5 is located between movable partition E and the pneumatically operated piston H, as close as possible to partition E, and the port 6 is located behind or to the right hand side, as viewed in FIG. 1, of pneumatically operated piston H.

The device functions as follows.

(a) By means of an appropriate pilot or distributing valve, not illustrated, compressed air is admitted through port 5 into the space L of pneumatic cylinder A. Thus, on one hand, piston H is held against the bottom of the cylinder and ram G is prevented from prematurely closing the bore 1, and one the other hand, the extensible reservoir F is pressurized as the partition E is moved by the compressed air in the direction of the arrow $f$, the fluid flows into hydraulic cylinder C and causes closure of the jaws of the vise of FIG. 2, for example, as the pneumatic cylinder A and rod D move in a direction opposite to the arrow *f*.

(b) When action on the pilot valve is continued, port 6 in its turn is set under pressure while port 5 is gradually relieved to permit ram G to close bore 1 and to plunge to the left, wtihout partition E being moved backwardly.

The foregoing two phases (a) and (b) respectively determine the closure and the clamping action of the apparatus.

(c) To bring about the unclamping action, the pilot valve is turned in the other direction as hereinafter described, port 6 is relieved while port 5 is set under pressure and piston H and ram G are forced to retreat abrutply.

Experience has shown that the expansion and distension brought about by such sudden decompression, suffices for relieving the sealing rings.

(d) By returning the pilot valve to its starting position, port 5 is relieved in its turn, and a slight push of a restoring means suffices to move partition E back to its original position and open the apparatus such as the illustrated vise, for example.

In the variant shown in FIG. 5, a manually controlled pilot or distributing valve M is mounted directly on the pressure multiplying device and is adjustable to provide the foregoing four phases by a minimum of angular movement in both rotary directions.

Valve M comprises a plate 8 that is integral with a tubular portion 9 which exfends through a bore in a cover 10 of a casing 11. A ring 12 to which are secured actuating arms 13 is fixed to the outside of tubular portion 9. Springs 14, disposed in blind bores formed in the cover 10, and acting through balls 15 tend constantly to push plate 8 against the underside of casing 11.

Plate 8 comprises apertures $5_1$ and $6_1$ (FIGS. 6 to 8) which may be brought to coincide or register with apertures $5_2$ and $6_2$ in communication respectively with the ports 5 and 6 of cylinder A by suitably manipulating the actuating arms 13. Plate 8 is also formed with an expansion or distention chamber 16 provided with radial extensions (FIGS. 6 to 8) and is open to the atmosphere through tubular portion 9.

FIGS. 6 to 8 schematically show the various positions of the valve M for effecting the desired pneumatic distribution. In FIG. 6 the valve occupies a position in which the pressure multiplying device is inactive. The apertures $5_2$ and $6_2$ are communication with each other through chamber 16, so that the ports 5 and 6 communicate with the atmosphere. The handles 13 occupy the position indicated by the dash-and-dot line.

Turning the valve plug, consisting of plate 8 and tubular portion 9, in the direction of arrow $f_1$ until the handles 13 occupy the position indicated by the dash-and-dot line in FIG. 7, aperture $5_1$ is brought to register or coincide with aperture $5_2$.

In the adjusted valve position of FIG. 7, compressed air flows into casing 11 through port 17 (FIG. 5) and into space L through the apertures $5_1$, $5_2$ and port 5, while port 6 always communicates with the atmosphere. In this instance, the jaws of the vise apparatus, for example, as shown in FIG. 2, are closed.

Turning the valve plug 8, 9 further until reaching the limit position of FIG. 8, the apertures $6_1$, $6_2$ register or coincide with each other, while aperture $5_2$ is gradually brought into communication with the atmosphere through chamber 16 and lug 9. In this instance, the chuck jaws are brought into engagement with the object to be gripped thereby.

It is clearly seen that for opening the chuck, by turning the valve plug in the reversed rotary direction and passing through the intermediate position (FIG. 7) in which port 6 again communicates with the atmosphere and port 5 is under pressure, the decompression described above is brought about abruptly, whereby the sealing rings are extended or relieved and the ckuck is opened rapidly.

Notches 18 in plate 8 indicate this intermediate position upon passage of the balls 15.

A stop dog 19 fixed to cover 10 and adapted to be engaged in a milled sector 20 of ring 12, limits the course of the valve plug in both rotary directions.

In the emebodiment shown in FIG. 9, the pressure multiplying device comprises a pneumatic cylinder 101 that is integral with a cylinder head 102 on which in turn is mounted the hydraulic cylinder 103.

A movable partition 104 is housed in cylinder head 102 and forms therewith an expansible reservoir which communicates with hydraulic cylinder 103 through a bore 105 that is closable by a ram 106 which passes through a central opening in partition 104. Ram 106 is actuated by the pneumatically operated piston 107. An end plug 108 is screwed to the base of pneumatic cylinder 101 and is provided, for example, with a threaded bolt 109 as means for mounting the pressure multiplying device.

Pneumatic cylinder 101 and hydraulic cylinder 103 are of substantially square cross-section (FIG. 10). At three of the corners of the square cross-section, at the outside of the piston recesses, bores 110, 111 are provided to accommodate restoring springs 112, and the fourth corner is formed with ports 113 and 114.

Tubular guides 115 that, for example, are integral with cylinder 103 by being press-fitted, for example, in bore 110, and are freely slidable in the bores 111 also serve as guards for the springs 112 and comprise at their two ends, respectively, a spring plate 116 provided with a threaded stud and a spring plate 117 with axial threads.

The springs 112 are mounted by screwing the spring plate 116 into threads provided in the bottom of the bores 111 before assembly, and the tension of the springs is adjusted after such assembly by means of tension screws 118.

Operation of the device shown in FIGS. 9 and 10 is as follows:

The pressure multiplying device is mounted on a stationary element (not shown) that is disposed, for example, on the table of a machine tool (not shown) by screwing the bolt 109 thereto or by any other suitable means, its axis being disposed in the direction of clamping desired and pneumatic cylinder 101 thus forming the base of the pressure multiplying device.

The tool or work to be clamped (not shown) is set against another stationary element (not shown) disposed in the extension of said axis at the top of FIG. 9, the spacing between the tool or work and the pressure multiplying device being less than the extension range thereof.

Under the control of a suitable pilot or distributing valve (not shown) and in a first phase of operation, compressed air enters through port 113 and acts on partition 104 to apply pressure to the reservoir fluid and moves hydraulic cylinder 103 until the tool or work to be clamped is engaged. In a second phase of the operation, compressed air enters through port 114 while port 113 communicates with the atmosphere, and pneumatically operated piston 107 causes ram 106 to block the bore 105 and isolate the fluid contained in hydraulic cylinder 103. Continuing its plunge into the bore 105, ram 106 initiates the clamping action. Hydraulic cylinder 103 plays the role of actuating element and the upper face thereof as shown in FIG. 9 clamps the workpiece against the non-illustrated stationary element at the top thereof as viewed in FIG. 9.

I claim as my invention:

1. A pneumohydraulic pressure multiplying device comprising a pneumatic cylinder having a cup-shaped cylinder head at one end thereof, a partition axially displaceable in said cylinder head and defining a fluid reservoir chamber with said cylinder head, a hydraulic cylinder telescopically mounted on said cylinder head and communicating with said fluid reservoir chamber through an opening in said cylinder head, said hydraulic cylinder and said pneumatic cylinder being axially displaceable relative to one another, a piston axially displaceable in said pneumatic cylinder and having a plunger extending axially through an opening in said displaceable partition and in axial alignment with the opening in said cylinder head, and port means in said pneumatic cylinder for selectively applying pneumatic pressure to said displaceable partition and said piston whereby said partition is displaceable in said cylinder head to force fluid from said fluid reservoir chamber into said hydraulic cylinder at a specific pressure so as to displace said hydraulic cylinder and said pneumatic cylinder relative to one another, and said piston is displaceable in said pneumatic cylinder to insert said plunger into said opening in said cylinder head for increasing the pressure of the fluid in said hydraulic cylinder.

2. A pneumohydraulic pressure multiplying device comprising a pneumatic cylinder having a cup-shaped cylinder head at one end thereof, a partition axially displaceable in said cylinder head and defining a fluid reservoir chamber with said cylinder head, a hydraulic cylinder telescopically mounted on said cylinder head and communicating with said fluid reservoir chamber through an opening in said cylinder heat, said hydraulic cylinder and said pneumatic cylinder being axially displaceable relative to one another, a piston axially displaceable in said pneumatic clyinder and having a plunger extending axially through an opening in said displaceable partition and in axial alignment with the opening in said cylinder head, sealing ring means of temporarily deformable material located between mutually slidably surfaces of the pressure multiplying device, said sealing ring being in deformed state and in binding engagement with said surfaces in the pressure applying positions of said partition and said piston, and port means in said pneumatic cylinder for selectively applying pneumatic pressure to said displaceable partition and said piston whereby said partition is displaceable in said cylinder head to force fluid from said fluid reservoir chamber into said hydraulic cylinder at a specific pressure so as to displace said hydraulic cylinder and said pneumatic cylinder relative to one another, and said piston is displacable in said pneumatic cylinder to insert said plunger into said opening in said cylinder head for increasing the pressure of the fluid in said hydraulic cylinder, said port means including a port located between said displaceable partition and said piston, said port being adapted to admit pneumatic pressure to said pneumatic clyinder between said partition and said piston so as to positively displace said piston axially away from said partition against the binding action of said deformed sealing ring means.

3. A pressure multiplying device according to claim 2, including a distributing valve attached to said pneumatic cylinder and communicating with said port means for selectively controlling the application of pneumatic pressure to said displaceable partition and said piston.

4. A pressure multiplying device according to claim 2, wherein said port means includes another port located in said pneumatic cylinder between said piston and an end wall of said pneumatic cylinder opposite to said cylinder head.

5. A pressure multiplying device according to claim 4, in which the first mentioned port is situated as close as possible to the movable partition, and the other port is situated close to the pneumatically operated piston.

6. A pressure multiplying device according to claim 2, in which the pneumatic and the hydraulic cylinders are of substantially square cross-section, at least one of the corners thereof being formed with an axially extending bore, a restoring spring disposed in said bore and secured at opposite ends respectively to said pneumatic and said hydraulic cylinders for biasing said cylinders toward one another, and said port means being located in another of the corners.

7. A pressure multiplying device according to claim 6, comprising a tubular guide secured to one of said cylinders and freely slidably in said bore formed in a corner of the other cylinder, said guide also serving as protection means for the spring.

8. A pressure multiplying device according to claim 7, in which the spring is secured at one end to a threaded stud located in said bore and screwed to the pneumatic cylinder and at the other end of the adjusting screw located in said bore and carried by said hydraulic cylinder and adjustable for regulating the tension of said spring.

9. A pressure multiplying device according to claim 2, in which the hydraulic cylinder is held stationary, and an axially extending rod integral with the cylinder head of the pneumatic cylinder is movable with said pneumatic cylinder relative to said hydraulic cylinder.

10. A pressure multiplying device according to claim 2, in which the pneumatic cylinder is held stationary and the hydraulic cylinder is movable relative to said pneumatic cylinder.

11. A pressure multiplying device according to claim 10, in which the pneumatic cylinder is closed by a plug member at its end opposite said cylinder head and a threaded bolt for mounting the device extends axially from said plug member.

References Cited by the Examiner

UNITED STATES PATENTS

| 582,839 | 5/97 | Winans | 60—54.5 X |
| 791,075 | 5/05 | Carpenter | 60—54.5 |
| 1,940,304 | 12/33 | Jackson | 60—54.5 |
| 2,915,878 | 12/59 | Hramoff | 60—54.5 |
| 2,990,687 | 7/61 | McCrea | 60—54.5 |
| 3,059,433 | 10/62 | Hirsch | 60—54.5 |

FOREIGN PATENTS

| 929,959 | 7/47 | France. |

JULIUS E. WEST, *Primary Examiner.*

ROBERT R. BUNEVICH, *Examiner.*